US006269966B1

(12) United States Patent
Pallo et al.

(10) Patent No.: US 6,269,966 B1
(45) Date of Patent: Aug. 7, 2001

(54) BLOW-MOLDED SNAPPED-TOGETHER HINGE FOR DOUBLE-WALLED BODY AND LID

(75) Inventors: R. David Pallo, Fairport; Roland M. Avery, Jr., Pittsford; James E. Masseth, Jr., Henrietta, all of NY (US)

(73) Assignee: John D. Brush & Co., Inc., Rochester, NY (US)

( * ) Notice: Subject to any disclaimer, the term of this patent is extended or adjusted under 35 U.S.C. 154(b) by 0 days.

(21) Appl. No.: 09/679,244

(22) Filed: Oct. 4, 2000

(51) Int. Cl.[7] .................................................. A47J 39/00
(52) U.S. Cl. ................... 220/592.25; 220/840; 220/4.22
(58) Field of Search ................ 220/592.25, 592.26, 220/592.2, 62.18, 592.27, 836, 837, 840, 831, 4.22, 4.21

(56) References Cited

U.S. PATENT DOCUMENTS

| | | | | |
|---|---|---|---|---|
| 3,612,335 | * | 10/1971 | Schurman | 220/469 |
| 4,340,139 | * | 7/1982 | Wilcox et al. | 206/349 |
| 4,624,557 | * | 11/1986 | Winn | 355/75 |
| 5,769,260 | * | 6/1998 | Killinger et al. | 220/334 |
| 6,073,789 | * | 6/2000 | Lundblade | 220/4.22 |

* cited by examiner

*Primary Examiner*—Stephen Castellano
(74) *Attorney, Agent, or Firm*—Eugene Stephens & Associates

(57) ABSTRACT

Projections and mating recesses for a hinge interconnecting a blow-molded double-walled container and lid are formed to be snap fit together while the recesses are warm from molding. The hinge projections and recesses are blow molded without forming any opening through a hinge wall into an interwall space. After the hinge projections and recesses are assembled, interwall spaces of the body and lid are each filled with a pourable insulation material that sets to make the assembled hinge strong and durable.

10 Claims, 6 Drawing Sheets

US 6,269,966 B1

BLOW-MOLDED SNAPPED-TOGETHER HINGE FOR DOUBLE-WALLED BODY AND LID

TECHNICAL FIELD

Hinges for blow-molded double-walled containers with lids.

BACKGROUND

Blow-molded double-walled resin bodies and lids can serve as insulated containers when filled with an insulation material. A hinge between the body and lid allows the lid to pivot open for access to the interior of the container, and at least parts of the hinge are preferably formed in the blow molding process that creates the body and lid.

After a blow-molded double-walled body and lid are filled with insulation material, the lid becomes heavier, which requires that the hinge supporting the lid for pivotal motion relative to the body be made robust and durable so as not to fail during the life of the product. Hinges for such blow-molded, insulated containers must also meet many other requirements, including low cost of manufacture, ease of assembly, reliable operation, and resistance to customer abuse.

Hinges have been formed in blow-molded double-walled containers by boring recess holes in either the body or lid so that projections mating with the holes can be snap fit into place. For several reasons, this is unacceptable for a container that will be filled with a fire-resistant insulation material. Such insulation is preferably pourable into the interwall spaces of the container and lid and later sets to a solid state. Hinge projections cannot simply extend through recess holes into interwall spaces of a double-walled container, because they would not be able to pivot after an insulation material becomes solid. Inserts must be arranged in the bore holes to receive the projections and separate the projections from any bond with the insulation material, but this requires extra parts that must be positioned to complete hinge assembly.

Another serious problem is that any holes bored into interwall spaces to accommodate hinge projections allow insulation material to leak out around the inserts at the edges of the holes when the insulation material is freshly poured and still flowable. Leaks around the hinge holes spoil the appearance of the container and require either an expensive cleanup or scrapping of a product.

We have devised a hinge that meets the requirements of low cost, reliability, and durability without requiring bore holes in a hinge region. Our hinge and its assembly aim at all the desired advantages implemented in a configuration that gives a container an attractive appearance.

SUMMARY OF INVENTION

Our improved hinge applies to blow-molded double-walled resin containers having a body and lid each having outer and inner walls that are separated to form respective interwall spaces filled with a fire-resistant material. The blow molding process that forms the body and lid also configures a hinge formed of projections and mating recesses. These are formed integrally with walls of the body and lid without penetrating the walls in the hinge region to form any opening into either interwall space.

The projections and recesses are dimensioned to allow the projections to be snap fit into the recesses when the recesses are still warm from blow molding. When the hinge parts are snapped together, the projections may be cooler than the recesses or may also be warm from the blow molding. After the projections are snapped into the recesses, the fire-resistant material is poured into the interwall spaces of the body and lid to fill these spaces; and as the insulation material sets to a solid state, it rigidifies the snapped-together projections and recesses and prevents the projections from being unsnapped from the recesses without destroying the hinge.

DRAWINGS

FIGS. 1 and 2 are isometric views of a preferred embodiment of a container body taken respectively from a front corner in FIG. 1 and from a rear corner in FIG. 2, to show a hinge region and a blow molded hinge recess.

FIGS. 3 and 4 are isometric views of a preferred form of lid for the body of FIGS. 1 and 2, the lid being viewed from a front corner in FIG. 3 and from a rear corner in FIG. 4, to show a hinge region and a pair of blow-molded projections formed to fit in the blow-molded recesses of the body of FIGS. 1 and 2.

DETAILED DESCRIPTION

Figure 1:
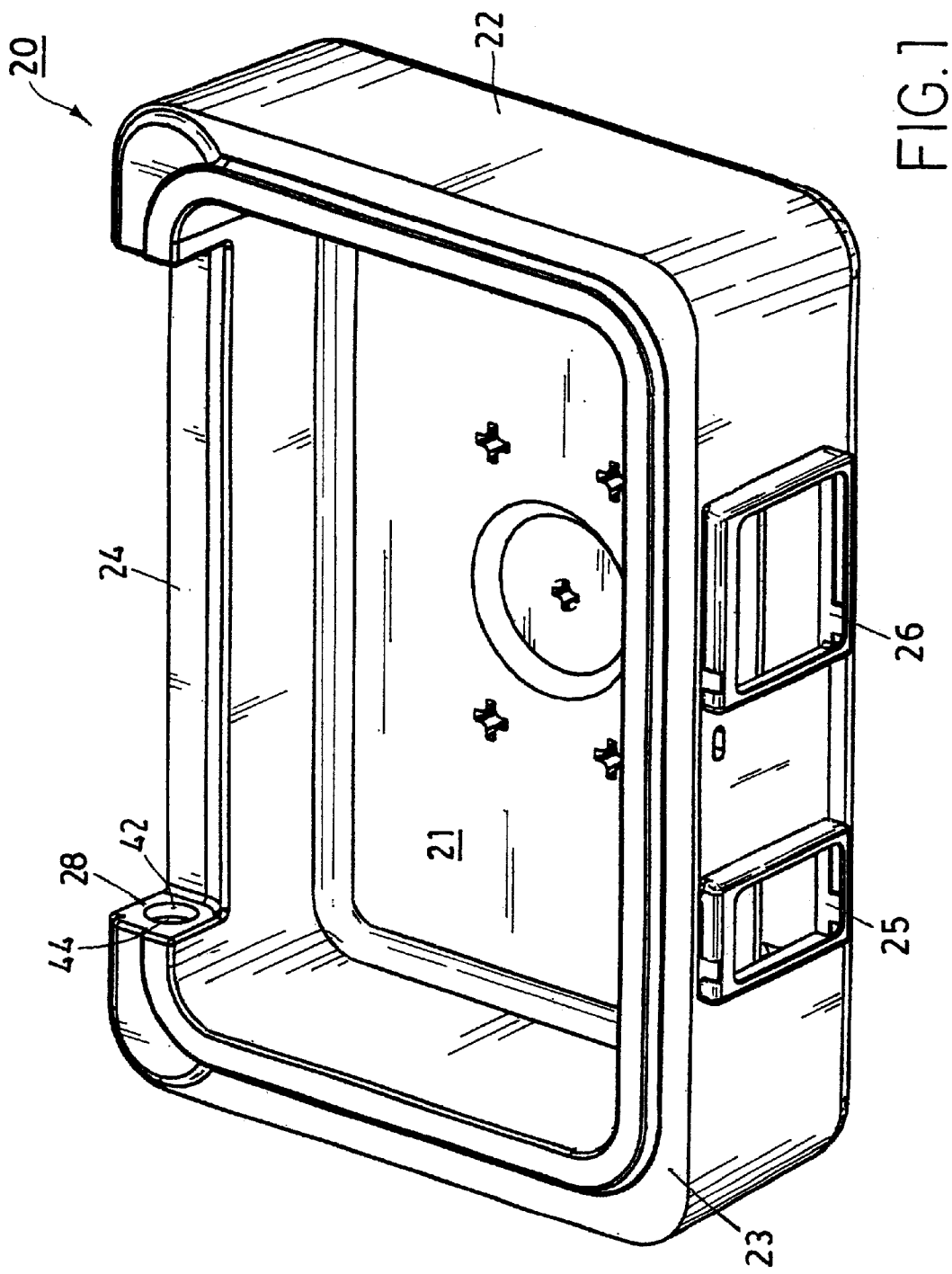

Preferred embodiments of container body 20 and container lid 30 are shown in FIGS. 1–4. Each of these are blow molded of resin to form inner and outer body walls 21 and 22 and inner and outer lid walls 31 and 32. The body walls 21 and 22 and lid walls 31 and 32 each enclose an interwall space to be filled with an insulation material. The distinction between outer and inner walls becomes blurred in jamb regions 23 and 33 and in hinge regions 24 and 34, because the inner and outer walls are integral and are blow molded in a continuous and uninterrupted form.

Filling openings 25 and 26 allow access to the interwall space between inner and outer body walls 21 and 22. Openings 25 and 26 allow an insulation material to be poured into and completely fill the interwall body space between walls 21 and 22. Similarly, filling openings 35 and 36 allow access to the interwall space between inner and outer walls 31 and 32 of lid 30. The lid interwall space is also filled with an insulation material.

One popular use for containers such as shown in the drawings and provided with the inventive hinge is to serve as fire-resistant containers. For such purpose, the insulation material poured into the interwall spaces is a fire-resistant material. A wide variety of suitable materials are known to be fire resistant, and the ones that are most preferred for small, fire-resistant containers are concrete type of materials. These and related fire-resistant materials are initially pourable so that they can be poured into the interwall spaces of the body and lid and completely fill those spaces. Thereafter, the pourable materials set to a solid state, which can vary according to the particular materials involved.

Figure 2:
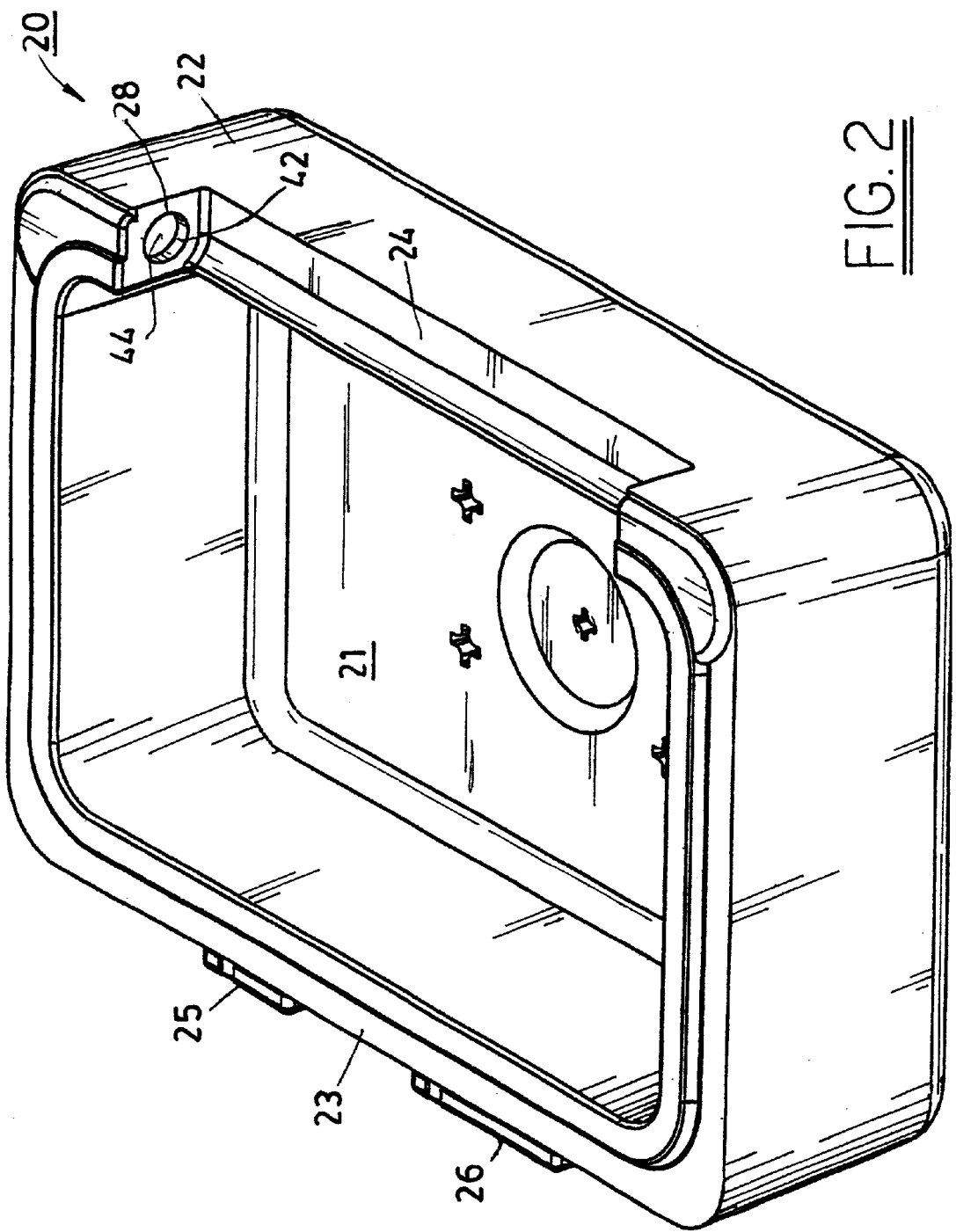
Figure 3:
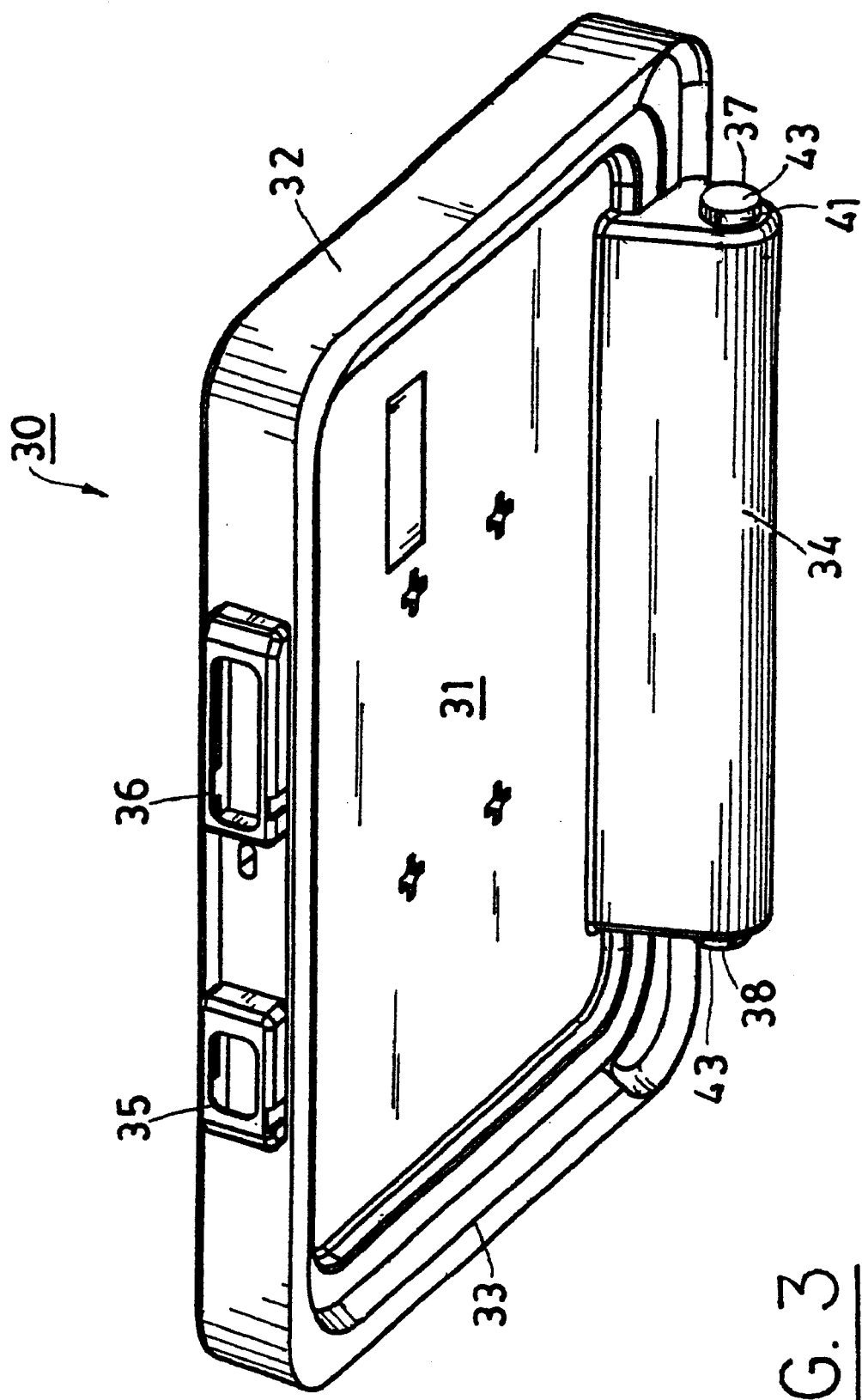
Figure 4:
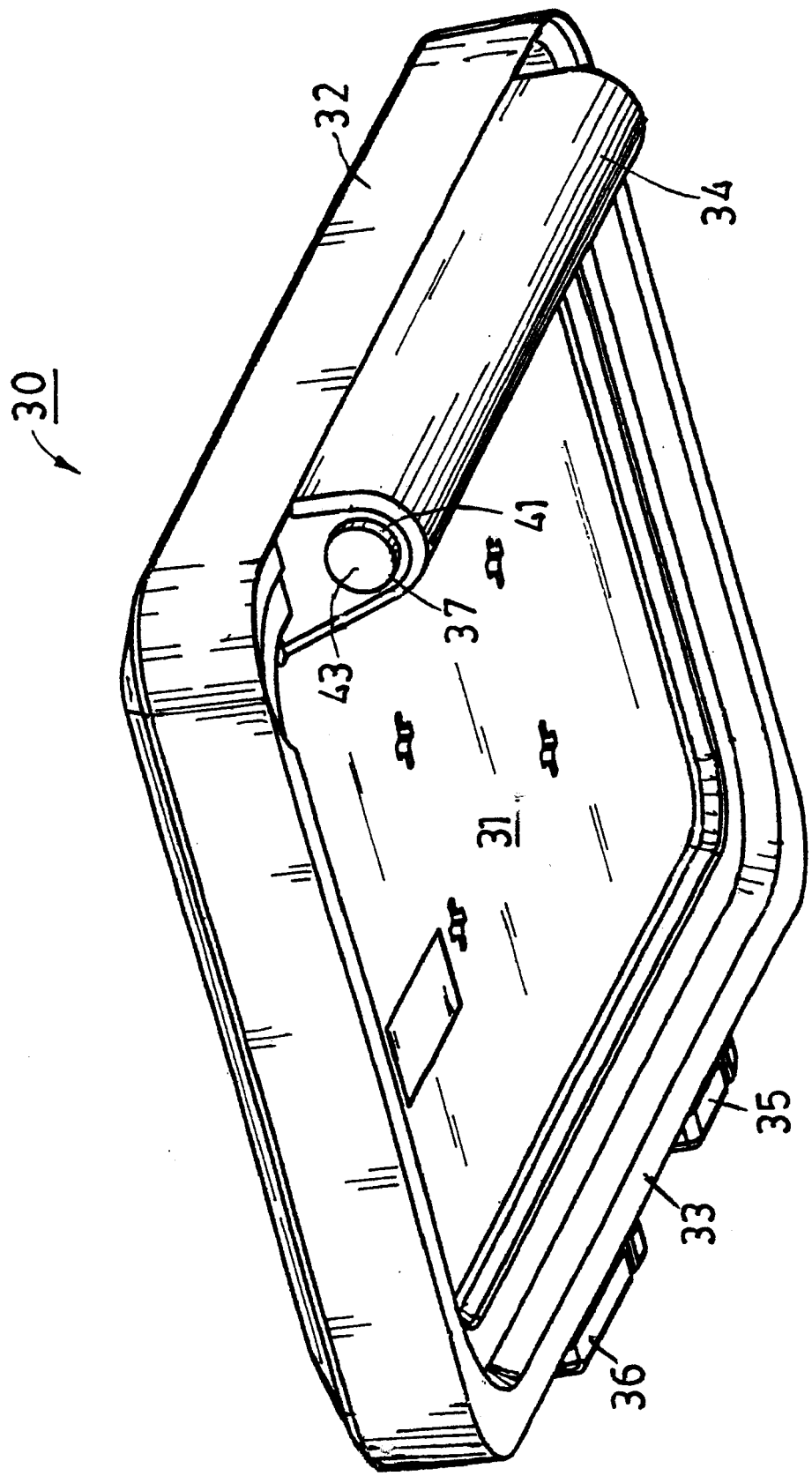

For purposes of this invention, a hinge formed between lid 30 and body 20 is most important. Hinge region 34 on lid 30 is formed with a pair of opposed projections 37 and 38 to be snap fit into a pair of confronting recesses 27 and 28 formed at opposite ends of hinge region 24 of body 20. In FIGS. 1 and 2, only recess 28 is visible; and recess 27, which is opposite recess 28, appears in the assembled cross-sectional hinge fragment of FIG. 5. We prefer that projections 37 and 38 be formed on lid 30 as illustrated and that mating recesses 27 and 28 be formed on body 20; but these parts can be reversed, with projections formed on body 20 and recesses formed on lid 30. It is also possible to form a projection and a recess on body 20 and a mating recess and projection on lid 30.

Projections 37 and 38 and mating recesses 27 and 28 are each formed integrally of the walls of container 20 and lid 30 without making any openings through these walls in hinge regions 24 and 34. This ensures that when body 20 and lid 30 are later filled with an insulation material that is flowable, the insulation will have no way to leak through a container wall in the hinge region. Integral container walls forming leak-free hinges also ensure that no leaked insulation needs to be cleaned up after assembling the container and no container needs to be scraped for damage from leaked insulation. Leaving projections 37 and 38 and recesses 27 and 28 integrally intact with container walls 21, 22, 31, and 32 also ensures that insulation will not bond to and interfere with operation of hinge projections.

The projections and recesses forming the hinge preferably supply the hinge strength and durability necessary for the uses intended for container 10. This encompasses a wide variety of possible shapes for projections and recesses. Preferably, all the possibly suitable shapes have mating configurations so that the projections fit into and rotate snugly within the recesses. Possible shapes include ball and socket configurations, conical shapes, cylindrical shapes, and mixtures of such shapes, such as barrel shapes.

In the preferred embodiment illustrated in the drawings, each of the hinge projections 37 and 38 preferably has an approximately cylindrical bearing or land surface 41 that extends axially of a hinge line 45 extending between the centers of projections 37 and 38. Land area 41 forms a bearing surface that engages and mates with a corresponding land area 42 formed in recesses 27 and 28. The interengagement of land areas 41 and 42 provides a preferably large bearing surface giving strength to the assembled hinge. For this purpose, land surfaces 41 and 42 have a preferred mating diameter of about 15 to 25 millimeters for a briefcase sized case and an axial extent in a direction of hinge axis 45 that preferably ranges from one-third to one-half the diameter of land areas 41 and 42. The diameter size of projections and recesses is limited by the thickness of the interwall spaces of the container and lid. For larger containers with more widely separated inner and outer walls, larger diameter projections and recesses may be preferred.

To ensure that insulation material later filling lid 30 completely fills the insides of hinge projections 37 and 38, we prefer that land areas 41 and 42 have a slight taper departing from truly cylindrical. A taper of a few degrees suffices for this and helps ensure that no voids in the insulation material occur from air trapped in the interwall spaces within projections 37 and 38. Any taper used is preferably applied equally to recesses 27 and 28 so that mating occurs between land areas 41 and 42 along their full axial length.

Projections and recesses 37 and 38 also preferably have slightly rounded or domed end regions 43 that mate with correspondingly domed recess regions 44. These facilitate the snapping of projections 37 and 38 into assembled relation with recesses 27 and 28. The rounded or domed shapes also help keep the projections axially aligned with the recesses during hinge rotation of the lid relative to the body.

With hinge projections 37 and 38 and recesses 27 and 28 dimensioned as preferred, it is possible to snap projections 37 and 38 into recesses 27 and 28 before lid 30 and body 20 are filled with insulation material. Snapping the hinge parts together involves placing one of the projections 37 or 38 into a mating one of the recesses 27 or 28 at an angle to hinge axis 45 and then manipulating lid 30 and body 20 to snap the other projection into the other recess in alignment with hinge axis 45.

The snap assembly of the hinge is preferably done when recesses 27 and 28 are still warm from blow molding. Blow molded parts typically shrink as they cool down after being ejected from a mold. We prefer snapping lid 30 and body 20 together before the container part formed with recesses 27 and 28 has cooled down and completed its shrinking. While still warm from a mold, body 20 has its recesses 27 and 28 slightly farther apart, and these are slightly more flexible than the recesses will become after the part has cooled down to room temperature.

Snapping the hinge together can be facilitated by having lid 30 with its projections 37 and 38 being cooled from the molding process to be cooler than body 20 to which lid 30 is assembled. A cooled lid 30 will have shrunk somewhat from its size upon leaving the mold so that it may be easier, with less risk of damage, to snap cooled projections 37 and 38 into warm recesses 27 and 28.

It may also be possible to snap projections 37 and 38 into recesses 27 and 28 while both lid 30 and body 20 are fresh from a mold and each are still warm from the molding process. Although neither part will have shrunk by very much when such a snap assembly is made, both parts will be more flexible when warm than they will become later when cooled.

After lid 30 is snap assembled to body 20, the lid and the body continue to cool and shrink until they reach room temperature. Their preferred configuration allows them to shrink together so that their interconnected sizes remain stable relative to each other. In other words, even though lid 30 and body 20 may shrink after assembly, they maintain their hinged connection.

Figure 5:
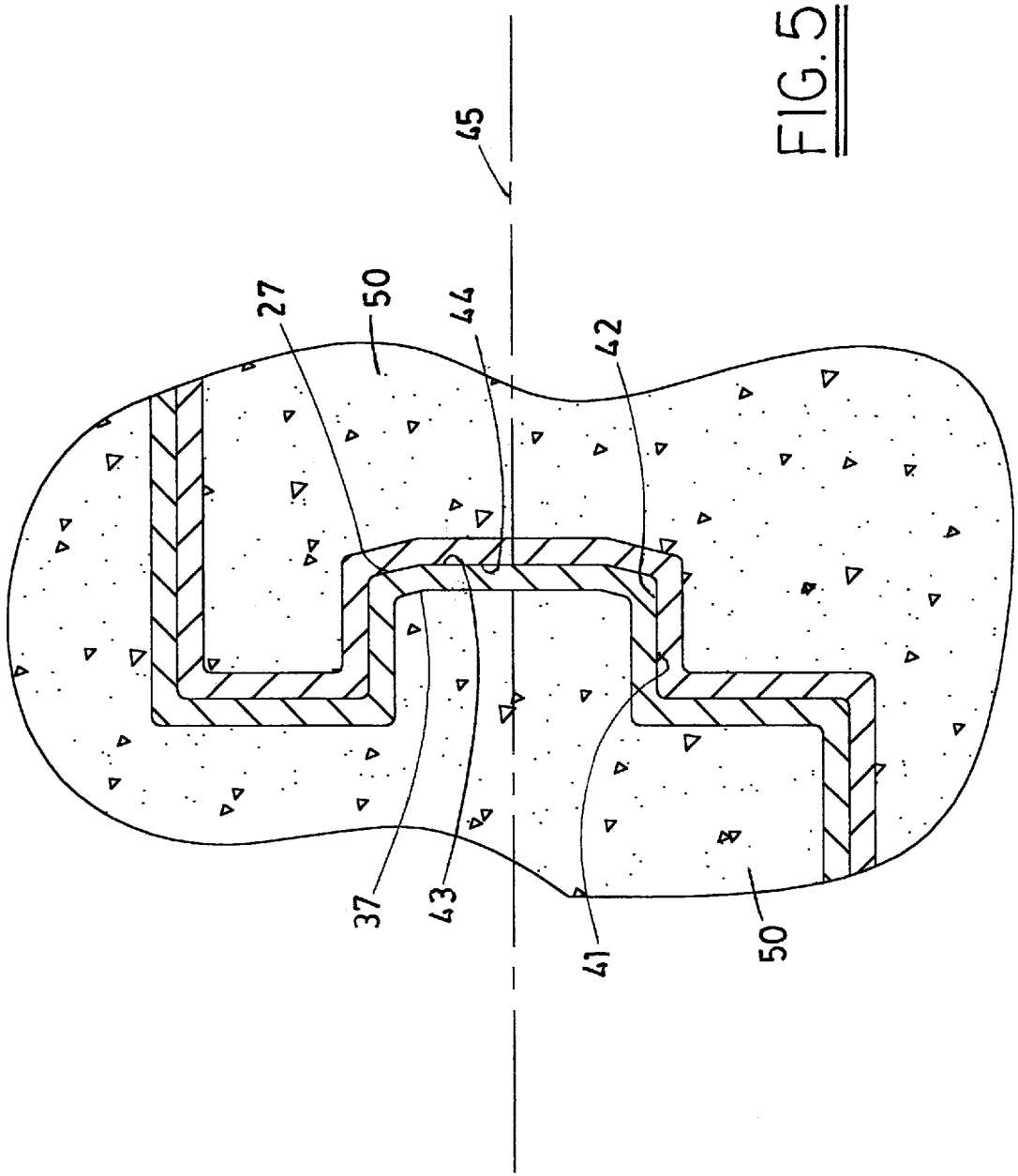
FIG. 5 is a fragmentary cross-sectional view of one of a pair of the lid's hinge projections and the body's recesses assembled in snapped-together relation.
Figure 6:
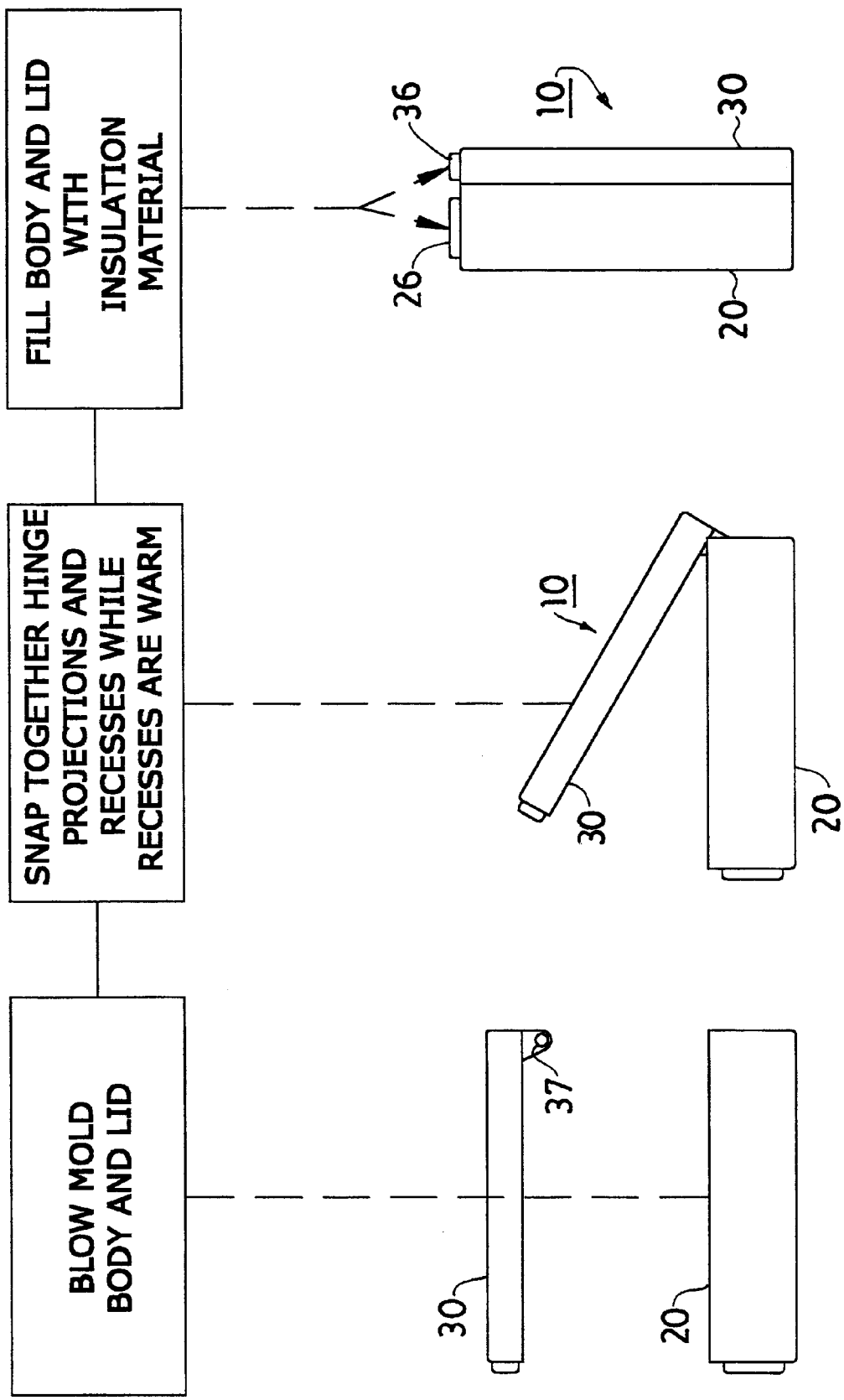
FIG. 6 is a schematic diagram of steps involved in forming and assembling a container with a hinge such as shown in FIGS. 1–5.

After body 20 and lid 30 are molded and snapped together, as shown in FIG. 6, they are filled with an insulation material that is poured through filling openings 25, 26, 35, and 36, as also shown in FIG. 6. The insulation material flows into and fills interwall spaces of both body 20 and lid 30 and later sets to form a solid material 50, shown in FIG. 5. Besides generally filling all the interwall spaces of body 20 and lid 30, solid 50 also fills the hinge regions 24 and 34, including the spaces behind projections 37 and 38 and the spaces around recesses 27 and 28. This rigidifies and stiffens the walls 21, 22, 31, and 32 of the body and lid and the hinge connection between projections 37 and 38 and mating recesses 27 and 28, as best shown in FIG. 5.

Once the walls of container 10 are stiffened by the setting of material 50, projections 37 and 38 and recesses 27 and 28 are no longer flexible enough to be separated. Any attempt to force projections 37 and 38 out of recesses 27 and 28 destroys the container hinge and the general usefulness of container 10. The inability to separate the hinge projections and recesses after concrete 50 has set also makes the hinge of container 10 strong and durable so that it can withstand considerable customer abuse.

We claim:

1. In a blow-molded double-walled container and lid each having outer and inner resin walls separated to form respective interwall spaces filled with a pourable insulation material that sets to a solid state, the improvement comprising:

a. a hinge between the body and the lid being formed of projections and mating recesses;

b. the projections and recesses being formed integrally with the walls of the body and lid without penetrating the walls for hinge purposes to form any opening into either interwall space in a region of the hinge;

c. the projections and recesses being dimensioned to allow the projections to be snap fit into the recesses when the recesses are still warm from blow molding; and d. the insulation material filling the interwall spaces of the body and lid rigidifying the snapped-together projections and recesses and preventing the projections from being unsnapped from the recesses.

2. The improvement of claim 1 wherein the projections and recesses have mating surfaces that extend approximately axially of a hinge pivot axis and afford land areas supporting the lid for pivotal movement relative to the body.

3. The improvement of claim 2 wherein the approximately axial extent of the land areas of the projections and recesses is from one-third to one-half the diameter of the mating surfaces.

4. The improvement of claim 1 wherein the projections have rounded distal ends, and the recesses have mating rounded bottoms.

5. The improvement of claim 1 wherein the projections are formed on the lid and the recesses are formed in the body.

6. A blow-molded double-walled container and lid comprising:

a. a hinge formed of projections and recesses hingedly interconnecting the container and lid;

b. the projections and recesses being formed integrally of blow-molded resilient resin forming walls of the container and lid without forming any opening through either wall in a region of the projections and recesses;

c. the projections and recesses being dimensioned to allow the resilient projections and recesses to be snap fit together in a hinge relationship;

d. interwall spaces between inner and outer walls of the container and lid being filled with a pourable insulation material that sets to stiffen the projections and recesses; and e. the projections and recesses being dimensioned so that when the container and lid are filled with the insulation material that has set, the projections and recesses cannot be separated without destroying the hinge.

7. The container and lid of claim 6 including mating surfaces of the projections and recesses extending approximately axially of a hinge axis.

8. The container and lid of claim 7 wherein the approximately axial extent of the mating surfaces of the projections and recesses has an axial length of from one-third to one-half of a diameter of the mating surfaces.

9. The container and lid of claim 6 wherein the projections are formed on the lid and the recesses are formed in the body.

10. The container and lid of claim 6 wherein the projections have rounded distal ends, and the recesses have mating rounded bottoms.

* * * * *